US007952759B2

(12) United States Patent
Wang et al.

(10) Patent No.: US 7,952,759 B2
(45) Date of Patent: May 31, 2011

(54) METHODS, APPARATUS AND SYSTEMS FOR BLENDING MULTIPLE GCRS

(75) Inventors: Yao Rong Wang, Webster, NY (US); Alvaro Enrique Gil, Rochester, NY (US); Lalit Keshav Mestha, Fairport, NY (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 461 days.

(21) Appl. No.: 12/127,473

(22) Filed: May 27, 2008

(65) Prior Publication Data

US 2009/0296153 A1 Dec. 3, 2009

(51) Int. Cl.
*H04N 1/40* (2006.01)
*G06F 15/00* (2006.01)

(52) U.S. Cl. .......... 358/1.9; 358/2.1; 358/523; 358/524; 358/529; 358/3.01

(58) Field of Classification Search .................. 358/1.9, 358/2.1, 3.01, 518, 523, 524, 529; 382/162, 382/167
See application file for complete search history.

(56) References Cited

U.S. PATENT DOCUMENTS

| | | | |
|---|---|---|---|
| 5,502,579 A | 3/1996 | Kita et al. | |
| 5,636,290 A | 6/1997 | Kita et al. | |
| 5,999,703 A * | 12/1999 | Schwartz et al. | 358/1.9 |
| 6,744,531 B1 | 6/2004 | Mestha et al. | |
| 7,259,893 B2 * | 8/2007 | Falk et al. | 358/2.1 |
| 7,280,690 B2 * | 10/2007 | Nogiwa | 382/167 |
| 7,729,014 B2 * | 6/2010 | Falk et al. | 358/529 |
| 2004/0119992 A1 * | 6/2004 | Falk et al. | 358/1.9 |
| 2007/0285726 A1 * | 12/2007 | Falk et al. | 358/529 |

OTHER PUBLICATIONS

R. Bala, "Device Characterization", Chapter 5, Digital Color Imaging Handbook, Gaurav Sharma Ed., CRC Press, 2003.
R. Balasubramanian, R. Eschbach, "Design of UCR and GCR strategies to reduce moiré in color printing", IS&TPICS Conference, pp. 390-393, 1999.
R. Balasubramanian, R. Eschbach, "Reducing multi-separation color moiré via a variable undercolor removal and gray-component replacement strategy", Journal of Imaging Science & Technology, vol. 45, No. 2, pp. 152-160, Mar./Apr. 2001.
S. Dianat, LK Mestha, A. Mathew, "Dynamic Optimization Algorithm for Generating Inverse Printer Maps with Reduced Measurements," IEEE Int. Conference on Acoustics, Speech, and Signal Processing, May 14-19, 2006, Toulouse, France.
Mestha et al., "Gray Balance Control Loop for Digital Color Printing Systems," Xerox Corporation, Sep. 18-23, 2005, Baltimore MD, 6 pages.
U.S. Appl. No. 11/585,463, filed Oct. 24, 2006, Mestha et al.
U.S. Appl. No. 11/959,824, filed Dec. 19, 2007, Mestha et al.
U.S. Appl. No. 12/017,746, filed Jan. 22, 2008, Mestha et al.
U.S. Appl. No. 12/127,643, filed May 27, 2008, Mestha et al.
U.S. Appl. No. 12/127,728, filed May 27, 2008, Maltz et al.
U.S. Appl. No. 12/127,719, filed May 27, 2008, Gil et al.

* cited by examiner

*Primary Examiner* — Kimberly A Williams
(74) *Attorney, Agent, or Firm* — Fay Sharpe LLP

(57) ABSTRACT

This disclosure provides methods, apparatus and systems for generating a multidimensional printer profile for a color printer. Specifically, the disclosure provides a method to blend multiple GCR functions or strategies to produce a final GCR blended printer profile, for example a printer profile LUT.

20 Claims, 6 Drawing Sheets

METHODS, APPARATUS AND SYSTEMS FOR BLENDING MULTIPLE GCRS

CROSS REFERENCE TO RELATED PATENTS AND APPLICATIONS

U.S. patent application Ser. No. 12/127,643, filed May 27, 2008, entitled "METHOD, APPARATUS AND SYSTEMS TO RETRIEVE GCRS FROM HISTORICAL DATABASE," by Mestha et al.;

U.S. patent application Ser. No. 12/127,719, filed May 27, 2008, entitled "COOPERATIVE NEIGHBOR PRINTING SYSTEM PROFILE METHODS AND SYSTEMS," by Gil et al.;

U.S. patent application Ser. No. 12/127,728, filed May 27, 2008, entitled "PRINTER PROFILING METHODS, APPARATUS AND SYSTEMS FOR DETERMINING DEVICE AND GAIN MATRIX VALUES," by Maltz et al.; and U.S. patent application Ser. No. 12/017,746, filed Jan. 22, 2008, entitled "METHOD AND APPARATUS FOR OPTIMUM BLACK COMPONENT DETERMINATION FOR GRAY COMPONENT REPLACEMENT" by Mestha et al. are herein incorporated by reference in their entirety.

BACKGROUND

This disclosure relates to printing systems. Specifically, this disclosure relates to methods and systems to generate profiles for one or more printing devices.

In image production systems that produce images on a recording medium, such as printers, photocopiers, facsimile machines and other xerographic devices, it is desired to control, as closely as possible, the actual perceived color of the output images. One known method to optimize image color output is to provide a look-up-table (LUT) that translates received color signals into optimized color signals for printing, for example, on a printer.

It is known, for example, that in three-color spaces, such as a Cyan-Magenta-Yellow (CMY) color space, gray color is made up of equal, or near-equal amounts of each one of the colors of the three-color space. Each color in a three-color space which is made up of non-negligible amounts of all three primary colors of the color space can be viewed as having a gray component. Expanding the three-color space to include Black (K) allows then, for most colors in the color space, for a black (K) component to be added in substitution for the gray component. In such a solution, a three-input, four-output LUT is needed.

Adding black (K) as a fourth color in this manner usually saves cost, as black (K) ink is usually cheaper than colored ink, and allows more colors to be produced than were achievable with the original three primary colors. Controlled amount of black addition is considered useful for high quality printing. Having black gives better stability to prints in the presence of print variables (relative humidity, temperature, material latitude etc.). Increased gamut for dark colors is also achieved with the addition of black toner. One major disadvantage in adding black is the excessive black in flesh tones, sky tones and other important tone scales can make these tone scales appear dirty/grainy or non-uniform with black toner. However, some key colors (e.g., flesh tones and sky tones) are sensitive to the addition of black and may not be perceived as optimal if too much black is added. The replacement of the inherent gray component of colors in a three-color space with a fourth, black (K) component is called gray component replacement (GCR) or under color removal (UCR). UCR is usually used when colors are near the neutral axis, such as, for example, the L* axis in L*a*b* space or the C=M=Y axis in CMY color space, GCR is similar to UCR, but can be used with colors throughout the color gamut, not just near or at neutral axes. The use of GCR and UCR is known to facilitate the production of pleasing color outputs, optimal gamut, and to improve constraints on area coverage.

Traditionally, determination of the black (K) component in a target color system was done in an ad hoc way by experienced practitioners. This method has the disadvantages of requiring experienced personnel, being generally irreproducible, being costly, and being time-consuming.

Another method used to transform colors in a three-dimensional color space, such as CMY color space, to a four-color color space, such as CMYK color space, is to determine the black (K) component by a one dimensional function that relates the black (K) component as a one-dimensional function of the other components. In the CMY color space, for example, the function K=min (C, M, Y) can be used. This method has the disadvantages of not producing sufficiently optimized colors for the entire color gamut, especially for specialized, or key, colors such as, for example, skin tones.

In another method, a flexible method for estimating the black (K) component comprises (1) determining a maximum black (K) component, (2) adjusting the black (K) component amounts based on chroma, and (3) determining the other color components. In examples of this method, disclosed in U.S. Pat. No. 5,502,579 to Kita et al, (Kita '529) and U.S. Pat. No. 5,636,290 to Kita et al (Kita '290), input image signals are transformed by a four-input-three output controller to L*a*b* color space. The disclosure of each of Kita '529 and Kita '290 is incorporated herein by reference in its entirety. A chroma determining means determines chroma signal C* from a* and b*. A UCR ratio calculation means calculates a UCR ratio a from the chroma signal C*. The L*a*b* and UCR ratio a are then converted into the CMYK output. This method also has the disadvantages of not producing sufficiently optimized colors for the entire color gamut.

In another method, disclosed in U.S. Pat. No. 6,744,531 to Mestha et al. (Mestha), incorporated herein by reference in its entirety, consistent output across multiple devices is obtained. For a given device, received device independent image data are stored as target image data and also converted by a data adjustment subsystem to printable image data based on the color space of the device. The printable image data is printed. An image sensor senses the printed image data and outputs detected device independent image data to the data adjustment subsystem. The data adjusting subsystem compares the detected device independent image data with the stored target image data and, based on the comparison, determines adjustment factors that are used to conform the printable image data output by the data adjusting subsystem to colors mandated by the device independent image data.

In R. Bala, "Device Characterization", Chapter 5, Digital Color Imaging Handbook, Gaurav Sharma Ed., CRC Press, 2003, several methods for determining the black (K) component are reviewed. One method is black addition in which the black (K) component is calculated as a function of a scaled inverse of L*. In another method, the black (K) component is calculated as a function of the minimum value of the other color components, such as C, M, and Y for the CMY color space. In a third method, a three input-four output transform, subject to imposed constraints, is used to calculate the black (K) component. The constraints placed on the transform include requiring the sum of the color component values at a node to be less than a threshold. For example, in CMYK color space, C+M+Y+K. would be constrained to be less than a threshold. A second constraint is to constrain K to be a subset of the range between the minimum and maximum allowed K values.

Another method is discussed in (1) R. Balasubramanian, R. Eschbach, "Design of UCR and GCR strategies to reduce moire in color printing", IS&TPICS Conference, pp. 390-393 (1999) and (2) R. Balasubramanian, R. Eschbach, "Reducing multi-separation color moire via a variable undercolor removal and gray-component replacement strategy", Journ. Imaging Science & Technology, vol. 45, no. 2, pp. 152-160, March/April, 2001. A UCR/GCR strategy is proposed that is optimized to reduce moire. In this method, the UCR/GCR strategy is to characterize moire as a function of the color components and to select optimized output color components when the moire function is minimized.

Documents that are representations in either electronic or print format inclusive of color graphics or other illustrative forms are generally created electronically in the "creative" stage of the production workflow with sections from various input devices such as, for example, scanners, cameras, computer graphics, etc. In this workflow, the documents are designed using various layout tools and their color appearance is fine tuned by typically proofing on a workgroup digital printer or the press itself. When the prints are made, it is expected that the appearance on the destination printer follows the proof. If it does not follow the proof, then adjustments are made to many places including the color management profile LUTs. One of the key adjustments is the selection of GCR (Gray Component Replacement) methods. As discussed above, the GCR method fine tunes the use of CMYK separations for improving the appearance. Particularly some of the key colors (e.g., black in flesh tones and sky tones) need less black. Sometimes, maximum gamut GCR is preferred over medium GCR to utilize the gamut fully. These adjustments are stored as standard profiles (e.g., ICC profiles).

This disclosure provides a blended GCR and is intended to give low toner usage without giving up the quality.

INCORPORATION BY REFERENCE

U.S. patent application Ser. No. 11/959,824, filed Dec. 19, 2007, entitled "METHOD FOR CLASSIFYING A PRINTER GAMUT INTO SUBGAMUTS FOR IMPROVED SPOT COLOR ACCURACY," by Mestha et al.;

U.S. patent application Ser. No. 11/585,463, filed Oct. 24, 2006, entitled "METHOD AND SYSTEM FOR ACQUISITION AND STORAGE OF IMAGE JOB MODEL INCLUDING IMAGE INFORMATION AND IMAGING DEVICE PRODUCTION STATE PERFORMANCE INFORMATION," by Mestha et al.;

U.S. Pat. No. 5,502,579, issued Mar. 26, 1996, entitled: "COLOR IMAGE PROCESSING METHOD AND APPARATUS CAPABLE OF ADJUSTING THE UCR RATIO," to Kita et al.;

U.S. Pat. No. 5,636,290, issued Jun. 3, 1997, entitled: "COLOR IMAGE PROCESSING," to Kita et al.;

U.S. Pat. No. 6,744,531, issued Jun. 1, 2004, entitled "COLOR ADJUSTMENT APPARATUS AND METHOD," to Mestha et al.;

R. Bala, "Device Characterization", Chapter 5, Digital Color Imaging Handbook, Gaurav Sharma Ed., CRC Press, 2003;

R. Balasubramanian, R. Eschbach, "Design of UCR and GCR strategies to reduce moire in color printing", IS&T PICS Conference, pp. 390-393 (1999); and R. Balasubramanian, R. Eschbach, "Reducing multi-separation color moire via a variable undercolor removal and gray-component replacement strategy", Journ. Imaging Science & Technology, vol. 45, no. 2, pp. 152-160, March/April, 2001 are herein incorporated by reference in their entirety.

BRIEF DESCRIPTION

According to one aspect of this disclosure a method for generating a multidimensional printer profile for a color printer is disclosed. The multidimensional printer profile comprises a) receiving a plurality of target colors associated with a device independent color space, each target color associated with a respective node of the device independent color space; b) calculating device dependent color space representations of the target colors as a function of a first Gray Component Replacement (GCR) strategy and a second GCR strategy, wherein the first GCR strategy and second GCR strategy are blended to generate a blended device dependent color space representation of a respective target color; c) associating the device dependent color space representations with their respective target colors to generate a multidimensional printer profile.

According to another aspect of this disclosure, a printing apparatus controller is disclosed which comprises a computer-usable data carrier storing instructions that, when executed by the controller, cause the controller to perform a method for generating a multidimensional printer profile for a color printer, the method comprising a) receiving a plurality of target colors associated with a device independent color space, each target color associated with a respective node of the device independent color space; b) calculating device dependent color space representations of the target colors as a function of a First Gray Component replacement (GCR) strategy and a second GCR strategy, wherein the first GCR strategy and second GCR strategy are blended to generate a blended device dependent color space representation of a respective target color; c) associating the device dependent color space representations with their respective target colors to generate a multidimensional printer profile.

According to still another aspect of this disclosure, a printing system is disclosed which comprises a color printing device configured to receive data representation of a color image to be marked on a media substrate; and a controller operatively connected to the color printing device, the controller configured to access a multidimensional printer profile LUT associating a plurality of calorimetric nodes with respective printing device dependent color space data representations, the printing device dependent color space data representations generated by the method comprising a) receiving a plurality of target colors associated with a device independent color space, each target color associated with a respective node of the device independent color space; b) calculating device dependent color space representations of the target colors as a function of a First Gray Component replacement (GCR) strategy and a second GCR strategy, wherein the first GCR strategy and second GCR strategy are blended to generate a blended device dependent color space representation of a respective target color; c) associating the device dependent color space representations with their respective target colors to generate a multidimensional printer profile wherein the controller accesses the printer profile LUT to provide printing device dependent color space data representations to the color printing device for marking on the media substrate.

DETAILED DESCRIPTION

Figure 1:
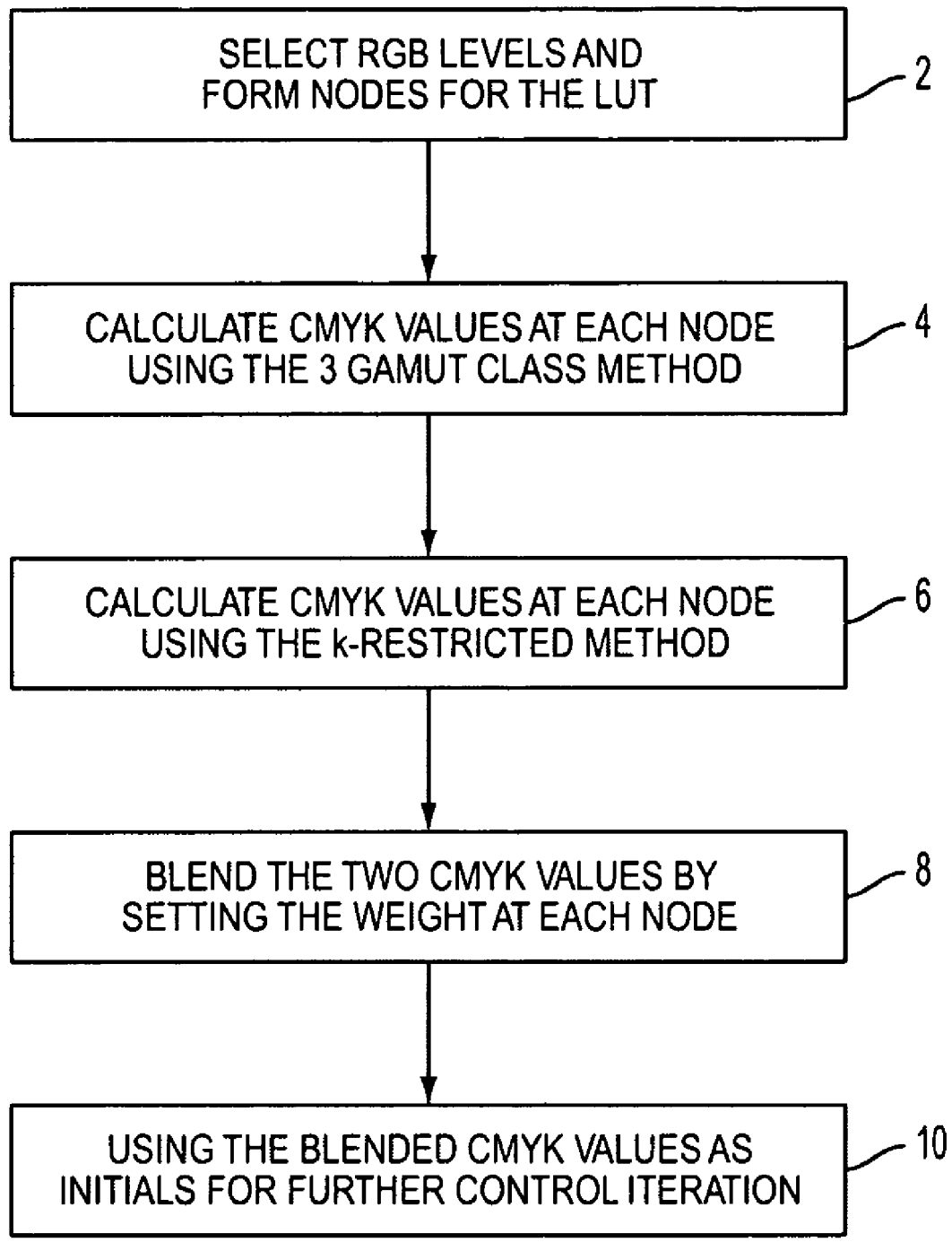
FIG. 1 illustrates a method for generating a multidimensional printer profile according to an exemplary embodiment of this disclosure.

Since GCR plays an important role in high quality color reproduction using toner or inks, generally print vendors fine tune the addition of black intelligently either by using complex algorithms or by using carefully designed experiments. Tuning often require many iterations. Once the tuning is done, it is useful to recreate those prints with similar black composition wherever necessary on different or same printer. If the recreation cannot be done automatically, it may take many days of manual iterations on the printer before part of those GCRs can be retrieved. R. Bala, "Device characterization," Chapter 5, *Digital Color Imaginq Handbook*, Gaurav Sharma Ed., CRC Press, 2003, shows how to capture the GCRs from other sources automatically retrieving historical ICC profiles. Once multiple GCRs are captured, or if a new one is found/created while fine tuning on a print engine, a process to blend various GCRs according to this disclosure can be executed. In this disclosure, shown is an algorithmic method to blend multiple GCRs.

In addition, each GCR may have advantage in certain regions of the color space, and may have disadvantage in other regions. For example, a 3 gamut class GCR provides about 20% reduction in toner usage by adding black toner wherever possible, but the GCR method suffers from graininess for skin & sky tones. Whereas a K-Restricted algorithm uses more toner when compared to 3 gamut class GCR, but improves the appearance of sky & flesh tones due to the use of less black. If these GCRs are blended, the best performance from both approaches can be achieved.

This disclosure provides a blending methodology for two or more GCRs. In particular, the embodiments provide blending for a k-restricted GCR method and a 3 gamut class GCR method, however, other blended GCR methods are within the scope of this disclosure. The blending method not only retains the advantages of multiple GCRs, but also provides smooth transition across separations to reproduce colors without visible contours.

In a CMYK printer, the same color can be made many different ways by substituting black for CMY. As previously discussed, this is known as "Grey component replacement." The CMY values that add to grey along the tone scale can be replaced with black separation. Gray component replacement only adds black to the CMY equivalent of grey. There are many advantages to add black to the CMY equivalent. Black toner generally costs less. Having black gives better stability to prints in the presence of print variables, for example, but not limited to, relative humidity, temperature, material latitude etc. In addition, GCR can expand the bottom part of the gamut to reproduce dark colors in printers. One major disadvantage in adding black is the excessive black in flesh tones, sky tones and other important tone scales can appear dirty/grainy or non-uniform.

Since GCR plays an important role in high quality color reproduction using toner or inks, generally print vendors fine tune the addition of black intelligently either by using complex algorithms or done experimentally with great care using many iterations. The disclosed embodiments simplify this task by allowing a user to blend together different GCRs, where each GCR is optimum for the region of color space where it will be used.

A k-restricted GCR method takes the color information such as $L^*a^*b^*$ and then calculates the black (K) amount based on the $L^*a^*b^*$ value from a specific function (k-function). Once the K value is calculated, CMY values are found from a printer model from the $L^*a^*b^*$ value. In the 3 gamut class method the $L^*a^*b^*$ values are classified into one of the three gamut, CYK, CMK and MYK. Once the $L^*a^*b^*$ values are classified, the corresponding colorants (CYK, CMK or MYK) can be calculated by inverting the printer model for the gamut. The 3 gamut class GCR method can produce images with less usage of the toner amount, but can have graininess more pronounced in the skin or flesh tone area of the image. In contrast, a k-restricted method can produce images with much less graininess in the skin or flesh tone area.

To blend the two GCRs, a k-function, see Ref [0004], is used for building the profile table as described by Eq. (1) and (2) below:

$$k = \frac{1}{U^\eta e^{-\alpha[(a^*-a_0)^2+(b^*-b_0)^2]/L^{*2}}+1} - \frac{1}{2}U^\eta \quad (1)$$

where $$U = 2\left(\frac{1}{e^{-\beta\left(\frac{L^*}{L_0-L^*}\right)^2}+1} - \frac{1}{2}\right) \quad (2)$$

This function has the following properties: (1) $k \to 1$ when $L^* \to 0$ so that maximum value of k is used at the dark end of the color space. (2) The function is symmetrical with respect to $a^*-a_0$ and $b^*-b_0$, and k increases when the color is away from the neutral zone. Notably, $a_0$ and $b_0$ can be a function of $L^*$. For example, if $a_0$ and $b_0$ are selected to be zero when $L^*=100$, and linearly interpolated to the $a^*$, $b^*$ and $L^*$ values at the gamut point C=M=Y=255, K=0, the k-function in Eq. (1) will be symmetrical around this new axis (brown axis). (3) $k \to 0$ when $L^* \to L_0$. Since $L_0$ is selected to be around 100, a small amount of black can be used near the white. FIG. 1 illustrates the function along the brown axis ($a^*-a_0=0$ and $b^*-b_0=0$) for the parameters given in the figure caption.

Figure 2:
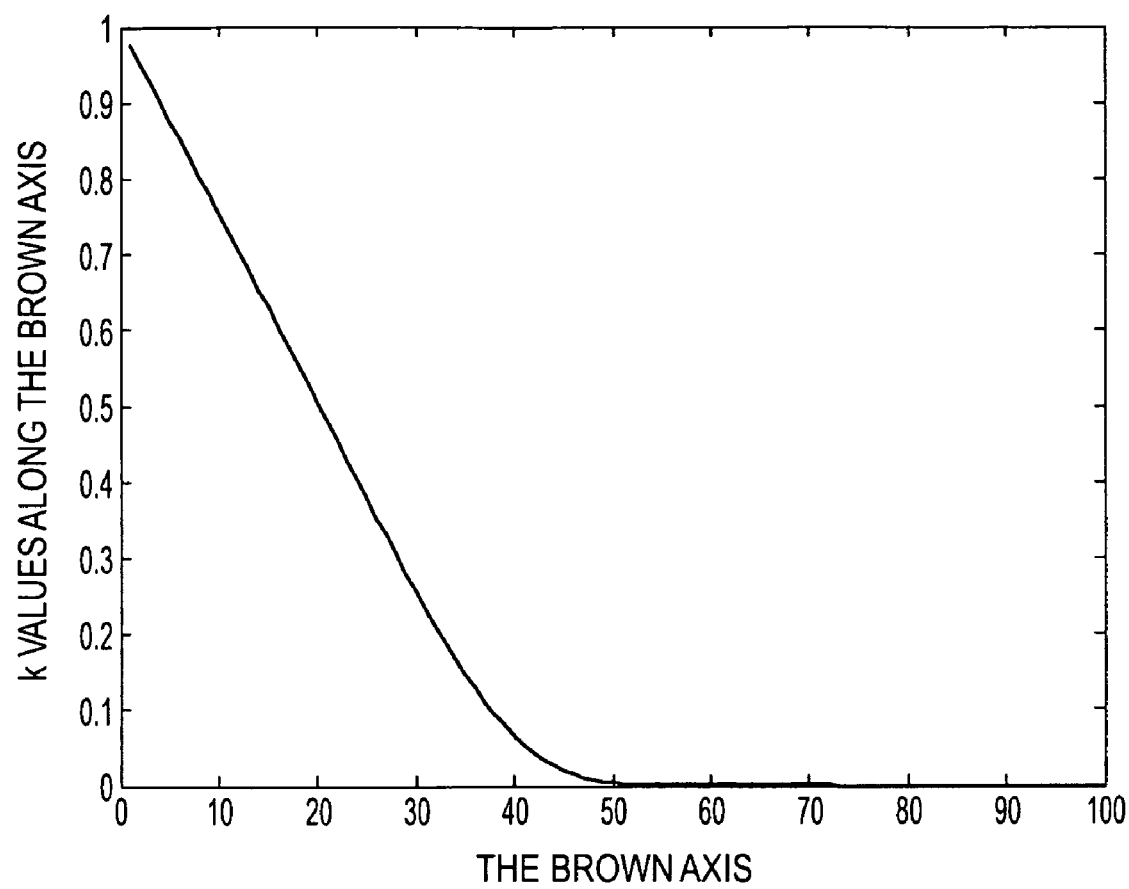
FIG. 2 illustrates a GCR strategy for a brown axis according to an exemplary embodiment of this disclosure.
Figure 3:
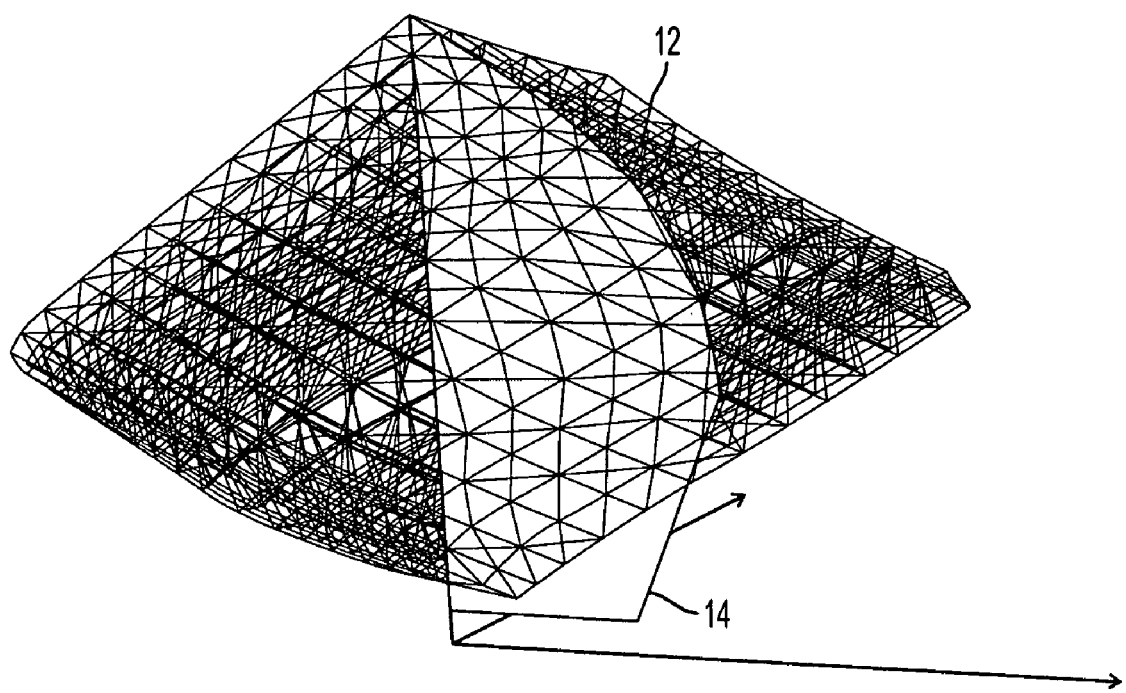
FIG. 3 illustrates a flesh tone gamut according to an exemplary embodiment of this disclosure.

FIG. 2 illustrates that the k-restricted method can therefore be used to minimize the k usage near the neutral and the brown axis where many of the flesh tones reside. FIG. 3 shows a flesh tone sub-gamut 14 compared with a printers full gamut 12.

A three gamut class method classifies the colors into CYK, CMK, and MYK sub-gamut that covers the whole printer gamut. Since one of the toners, C, M, or Y, will set to zero for any given color, the toner usage is usually smaller than that of other method. For details of how the three gamut method works, please see Ref. [0017].

The result of both the k-Restricted and three gamut class calculations are calorimetric to CMYK multidimensional lookup tables (LUTs). If, for example, the calorimetric space is sRGB, then the LUT stores the CMYK value needed to get the corresponding sRGB value at each of the nodes in a rectangular grid in sRGB space. To create the blended LUT, the formula:

$$CMYKb(RGB)=a(RGB)*CMYKr(RGB)+(1-a(RGB))*CMYKt(RGB)$$

is used, where CMYKb(RGB) is the CMYK value at a node in the RGB grid of the blended LUT, CMYKr(RGB) and CMYKt(RGB) are the corresponding entries in the kRestricted and three gamut class LUTs, and a(RGB) is the corresponding weighting factor, a number between 0 and 1. The weighting factor is large in the parts of color space where the characteristics of the kRestricted algorithm are desired, and small elsewhere. A smooth transition from high to low valued regions is required to prevent contours.

One way of generating the a(RGB) function is to define the region where a(RGB) is to be high by specifying a swarm of points in this region; for example, a set of flesh tone colors. A gamut is built that encloses the region of color space that is enclosed by the swarm. The nodes of the a(RGB) function that lie within the gamut are set to 1, and the rest are set to zero. The function is then smoothed with standard filtering techniques. Techniques to build the gamut and determine which colors are inside and which ones are outside are also well known to those skilled in the art, and will not be discussed in more detail here.

With reference to FIG. 1, a flow chart shows the steps for blending the 3 gamut class and the k-restricted for profiling. Initially 2, a plurality of RGB levels corresponding to the target colors, are selected and form the nodes of the LUT.

Next 4, the initial CMYK values of all the profile LUT nodes using the 3 gamut class are calculated.

Next 6, the initial CMYK values for all the profile LUT nodes using the k-restricted method are calculated.

Next 8, the two CMYK values calculated for each node are blended by setting a weight at each node.

Next 10, since the blended initial CMYK values may not give accurate L*a*b* values at the nodes, an iterative profile control method using a printer model may be used to finalize the initial CMYK values.

Testing of the blending method has produced images with improvements over the 3 gamut class method and the k-restricted method.

Other GCRs which may be blended include, but are not limited to, (1) Medium GCR and (2) Blended 3 gamut class with K-Restricted. Tests have been completed for iterating on a printer model and for iterating on a printer.

Figure 4:
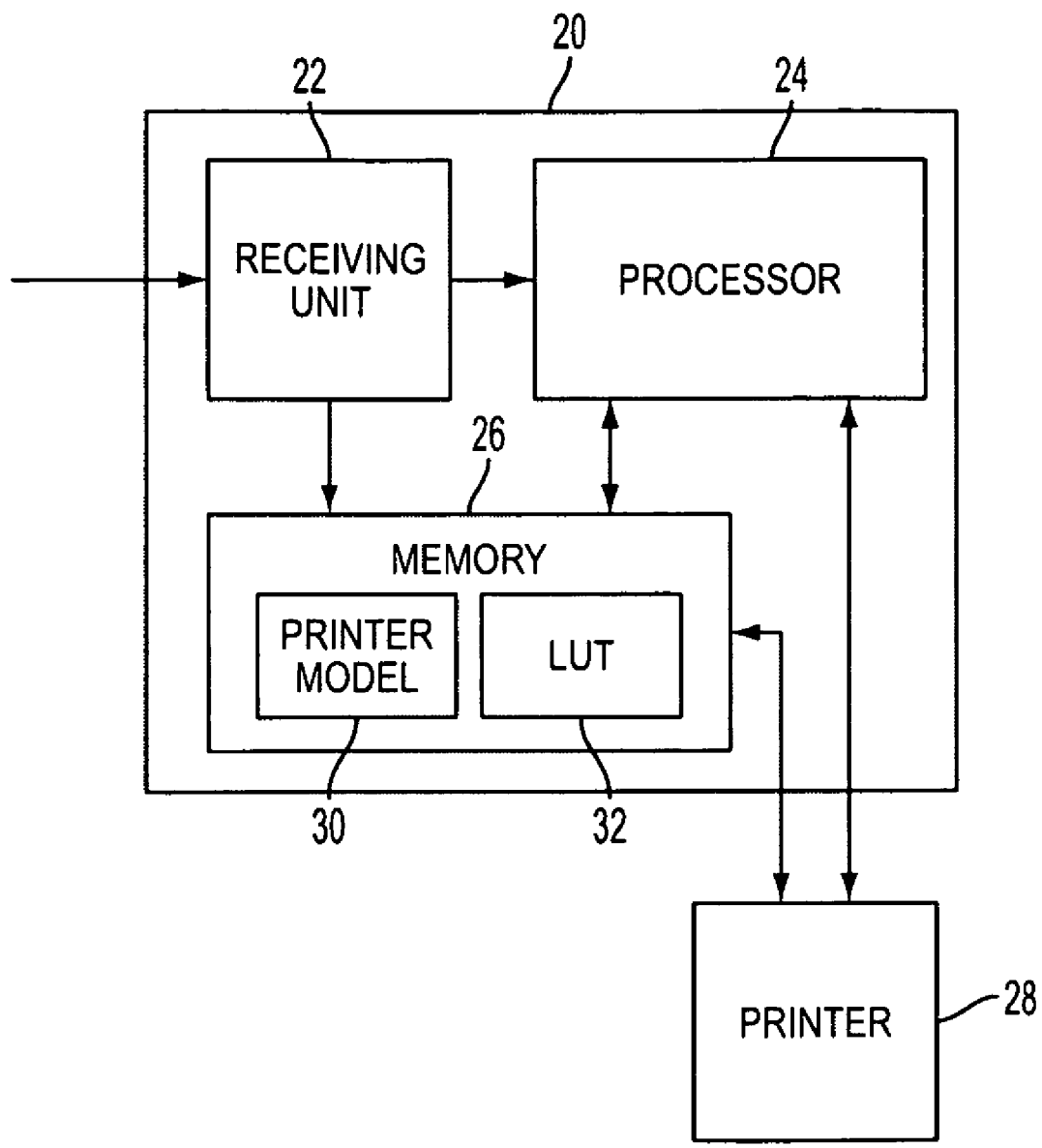
FIG. 4 is a block diagram showing a hardware configuration for a printing apparatus/system according to an exemplary embodiment of this disclosure.

With reference to FIG. 4, shown is a block diagram of a printing apparatus/system for generating a printer profile according to an exemplary embodiment of this disclosure.

The printing apparatus/system 20 includes a data receiving unit 22 to receive an image file and/or a plurality of target color nodes. Alternatively, the receiving unit may include an image scanning means to generate RGB or L*a*b* data representations of an image/target colors. The printing apparatus/system also includes a processor 24, computer memory 26 and a printer 28 to produce a marked media, such as a sheet. The computer memory includes a printer model 30 and a profile LUT 32 generated according to the methods described herein.

Figure 5:
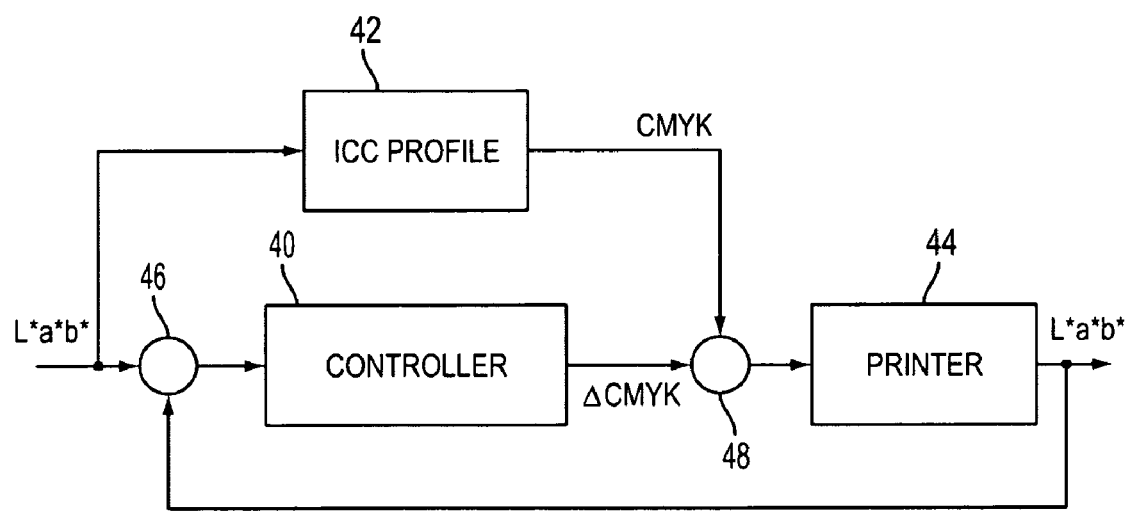
FIG. 5 is a control system schematic according to an exemplary embodiment of this disclosure.

With reference to FIG. 5, illustrated is a printer control system schematic providing the operative features of a control system to generate a profile LUT according to the methods disclosed herein. The control system includes a controller 40, an ICC profile 42, i.e., profile LUT, a comparator 46, a summer/integrator 48 and a printer 44. Alternatively, printer 44 could be a printer model.

In operation, a Lab color is input to the ICC profile, which generates a CMYK value for the respective target color. The CMYK value is input to the printer/printer model which generates a Lab representation of the CMYK value. The outputted Lab value is then compared with the target Lab value and an error signal is generated. The controller 40 receives the error signal and generates a delta CMYK to correct for the error. The summer/integrator adjusts the ICC profile output to correct for the error and the new CMYK value is fed to the printer/printer model 44 to generate a second Lab output. This process is performed iteratively, while updating the ICC profile for each iteration, until the CMYK representation of the inputted Lab converges within an acceptable error. The initial ICC profile is initially generated by the methods disclosed herein.

Figure 6:
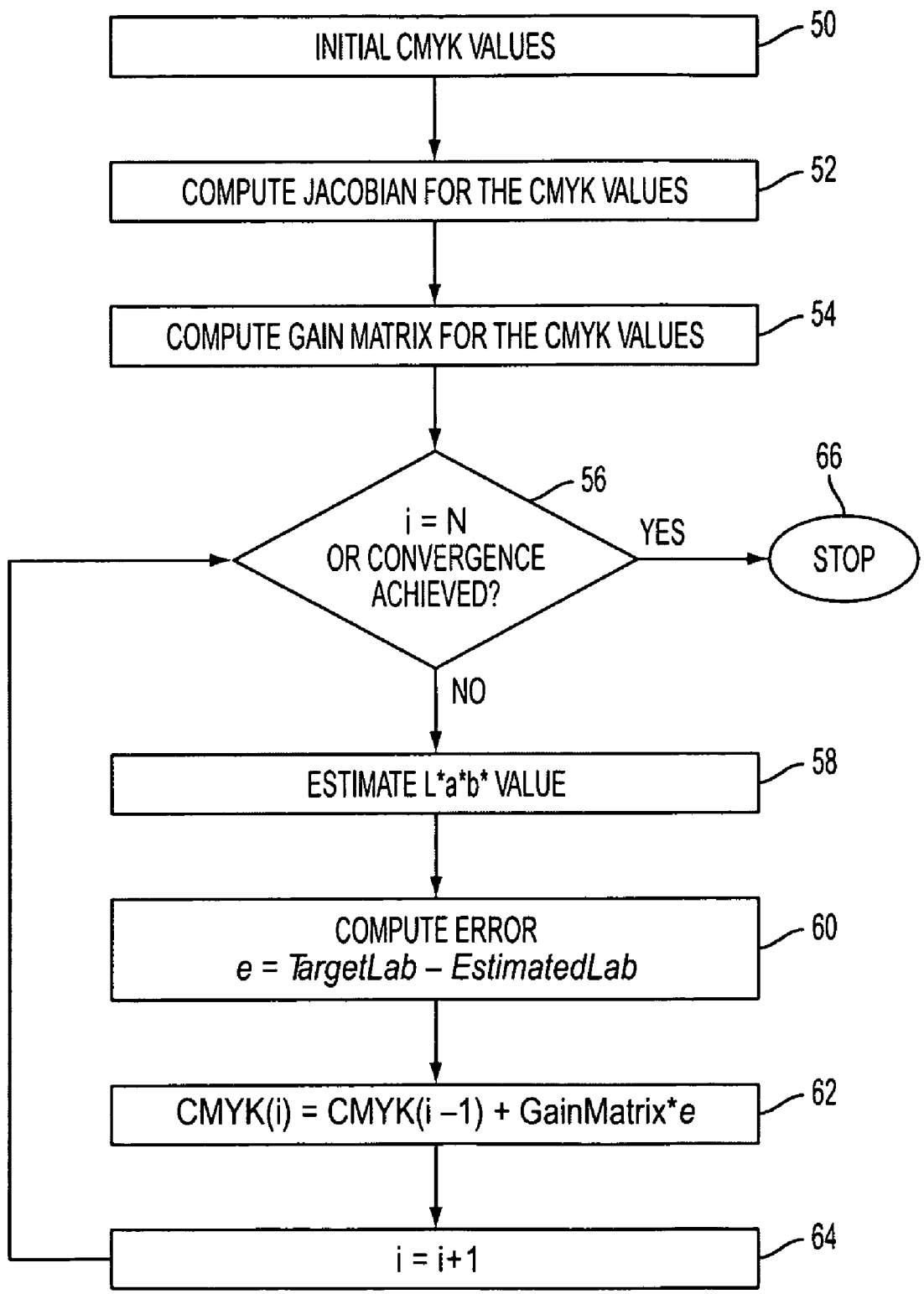
FIG. 6 illustrates another method for generating a multidimensional printer profile according to an exemplary embodiment of this disclosure.

With reference to FIG. 6, illustrated is a control method of generating a multidimensional profile LUT according to an exemplary embodiment of this disclosure.

The flowchart shown in FIG. 6 provides an iterative control method to generate a final printer profile based on initial CMYK values calculated for the RGB target color nodes previously discussed. The initial CMYK values calculated for the RGB target color nodes previously discussed. The initial CMYK values incorporate a blended GCR strategy/function as disclosed herein.

Initially 50, the initial blended GCR CMYK values are accessed.

Next 52, a Jacobian is calculated for the initial CMYK values.

Next 54, a gain matrix is calculated for the initial CMYK values.

Next 56, an iterative controller determines if a maximum number of iterations have been achieved and/or convergence achieved.

Next 58, the process estimates a Lab value corresponding to the initial CMYK values.

Next 60, a target error e is calculated where e=Target Lab-Estimated Lab.

Next 62, a new CMYK is calculated as a function of the error e and the gain matrix.

Next 64, the iteration counter is incremented, and the process returns to step 56 to determine if an additional iteration is required and/or permitted.

After the iteration process is completed, the iterative control process stops 66.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for generating a multidimensional printer profile for an operatively associated color printing system including a color printer, the color printing system configured to access the multidimensional printer profile to generate a color print, the method comprising:
   a) receiving a plurality of target colors associated with a device independent color space, each target color associated with a respective node of a colorimetric color space;
   b) calculating device dependent color space representations of the target colors as a function of a first Gray Component Replacement (GCR) strategy and a second GCR strategy, wherein the first GCR strategy and second GCR strategy are blended to generate a blended device dependent color space representation of a respective target color;

c) associating the device dependent color space representations with their respective target colors to generate a multidimensional printer profile, step b) and c) comprising:

calculating a first group of device dependent color space representations of the target colors using a first Gray Component Replacement (GCR) strategy;

calculating a second group of device dependent color space representations of the target colors using a second GCR strategy; and blending the first and second group of device dependent color space representations to generate the multidimensional printer profile including a device dependent color space representation calculated as a function of the respective device dependent color space representation associated with the first group and the respective device dependent color space representation associated with the second group;

d) iteratively calculating a second set of device dependent color space representations using the respective calculated device dependent color space representations of step b) as initial values and using the respective target colors to generate an error which is iteratively reduced; and e) associating the second set of device dependent color space representations with their respective target colors to generate a second multidimensional printer profile.

2. A method for generating a multidimensional printer profile for an operatively associated color printing system including a color printer, the color printing system configured to access the multidimensional printer profile to generate a color print, the method comprising:

a) receiving a plurality of target colors associated with a device independent color space, each target color associated with a respective node of a colorimetric color space;

b) calculating device dependent color space representations of the target colors as a function of a first Gray Component Replacement (GCR) strategy and a second GCR strategy, wherein the first GCR strategy and second GCR strategy are blended to generate a blended device dependent color space representation of a respective target color, the blended device dependent color space representations of the respective node associated with the target colors are calculated using the formula:

$$Y_{kb}(X)=a(X)*Y_{k1}(X)+(1-a(X))*Y_{k2}(X),$$

where $Y_{kb}(X)$ represents the blended device dependent color space representation associated with node X, $Y_{k1}(X)$ represents the device dependent color space representation associated with node X using the first GCL strategy, $Y_{k2}(X)$ represents the device dependent color space representation associated with node X using the second GCR strategy, and a represents a weighting factor between 0 and 1 associated with each node;

c) associating the device dependent color space representations with their respective target colors to generate a multidimensional printer profile, step b) and c) comprising:

calculating a first group of device dependent color space representations of the target colors using a first Gray Component Replacement (GCR) strategy;

calculating a second group of device dependent color space representations of the target colors using a second GCR strategy; and blending the first and second group of device dependent color space representations to generate the multidimensional printer profile including a device dependent color space representation calculated as a function of the respective device dependent color space representation associated with the first group and the respective device dependent color space representation associated with the second group.

3. The method for generating a multidimensional printer profile according to claim 2, wherein the colorimetric space for the nodes is one of RGB and L*a*b*, and the device dependent color space is CMYK.

4. The method for generating a multidimensional printer profile according to claim 2, wherein the colorimetric space of the nodes is RGB and the device dependent color space is CMYK, and the blended device dependent color space representations of the respective node is calculated using the formula:

$$CMYK_b(RGB)=a(RGB)*CMYK1(RGB)+(1-a(RGB))*CMYK_2(RGB),$$

where $CMYK_b(RGB)$ represents the blended device dependent color space representation associated with the respective RGB node, $CMYK1(RGB)$ represents the device dependent color space representation associated with the respective RGB node using the first GCR strategy, $CMYK_2(RGB)$ represents the device dependent color space representation associated with the respective RGB node using the second GCR strategy, and a represents a weighting factor between 0 and 1 associated with each node.

5. The method for generating a multidimensional printer profile according to claim 2, wherein the weighting factor associated with each node is based on the classification of the nodes in the color space region.

6. The method for generating a multidimensional printer profile according to claim 5, wherein the weighting factors are filtered to produce smooth transitions.

7. A method for generating a multidimensional printer profile for an operatively associated color printing system including a color printer, the color printing system configured to access the multidimensional printer profile to generate a color print, the method comprising:

a) receiving a plurality of target colors associated with a device independent color space, each target color associated with a respective node of a colorimetric color space;

b) calculating device dependent color space representations of the target colors as a function of a first Gray Component Replacement (GCR) strategy and a second GCR strategy, wherein the first GCR strategy and second GCR strategy are blended to generate a blended device dependent color space representation of a respective target color;

c) associating the device dependent color space representations with their respective target colors to generate a multidimensional printer profile, step b) and c) comprising:

calculating a first group of device dependent color space representations of the target colors using a first Gray Component Replacement (GCR) strategy;

calculating a second group of device dependent color space representations of the target colors using a second GCR strategy; and blending the first and second group of device dependent color space representations to generate the multidimensional printer profile including a device dependent color space representation calculated as a function of the respective device dependent color space representation associated with the first group and the respective device dependent color space representation associated with the second group;

wherein the first GCR strategy is a K restricted method and the second GCR strategy is a gamut classification method.

8. A printing apparatus controller comprising:

a non-transitory computer readable medium storing instructions that, when executed by the controller, cause the controller to perform a method for generating a multidimensional printer profile for a color printer, the method comprising:

a) receiving a plurality of target colors associated with a device independent color space, each target color associated with a respective node of the device independent color space;

b) calculating device dependent color space representations of the target colors as a function of a First Gray Component replacement (GCR) strategy and a second GCR strategy, wherein the first GCR strategy and second GCR strategy are blended to generate a blended device dependent color space representation of a respective target color;

c) associating the device dependent color space representations with their respective target colors to generate a multidimensional printer profile, step b) and c) comprising:

calculating a first group of device dependent color space representations of the target colors using a first Gray Component Replacement (GCR) strategy;

calculating a second group of device dependent color space representations of the target colors using a second GCR strategy;

blending the first and second group of device dependent color space representations to generate the multidimensional printer profile including a device dependent color space representation calculated as a function of the respective device dependent color space representation associated with the first group and the respective device dependent color space representation associated with the second group;

d) iteratively calculating a second set of device dependent color space representations using the respective calculated device dependent color space representations of step b) as initial values and using the respective target colors to generate an error which is iteratively reduced; and e) associating the second set of device dependent color space representations with their respective target colors to generate a second multidimensional printer profile.

9. A printing apparatus controller comprising:

a non-transitory computer readable medium storing instructions that, when executed by the controller, cause the controller to perform a method for generating a multidimensional printer profile for a color printer, the method comprising:

a) receiving a plurality of target colors associated with a device independent color space, each target color associated with a respective node of the device independent color space;

b) calculating device dependent color space representations of the target colors as a function of a First Gray Component replacement (GCR) strategy and a second GCR strategy, wherein the first GCR strategy and second GCR strategy are blended to generate a blended device dependent color space representation of a respective target color, the blended device dependent color space representations of the respective node associated with the target colors calculated using the formula:

$$Y_{kb}(X)=a(X)*Y_{k1}(X)+(1-a(X))*Y_{k2}(X),$$

where $Y_{kb}(X)$ represents the blended device dependent color space representation associated with node X, $Y_{k1}(X)$ represents the device dependent color space representation associated with node X using the first GCR strategy, $Y_{k2}(X)$ represents the device dependent color space representation associated with node X using the second GCR strategy, and a represents a weighting factor between 0 and 1 associated with each node; and c) associating the device dependent color space representations with their respective target colors to generate a multidimensional printer profile;

step b) and c) comprising:

calculating a first group of device dependent color space representations of the target colors using a first Gray Component Replacement (GCR) strategy; and calculating a second group of device dependent color space representations of the target colors using a second GCR strategy;

blending the first and second group of device dependent color space representations to generate the multidimensional printer profile including a device dependent color space representation calculated as a function of the respective device dependent color space representation associated with the first group and the respective device dependent color space representation associated with the second group.

10. The printing apparatus controller according to claim 9, wherein the device independent color space is one of RGB and L*a*b*, and the device dependent color space is CMYK.

11. The printing apparatus controller according to claim 9, wherein the color space of the nodes is RGB and the device dependent color space is CMYK, and the blended device dependent color space representations of the respective node is calculated using the formula:

$$CMYK_b(RGB)=a(RGB)*CMYK1(RGB)+(1-a(RGB))*CMYK_2(RGB),$$

where $CMYK_b(RGB)$ represents the blended device dependent color space representation associated with the respective RGB node, $CMYK1(RGB)$ represents the device dependent color space representation associated with the respective RGB node using the first GCR strategy, $CMYK_2(RGB)$ represents the device dependent color space representation associated with the respective RGB node using the second GCR strategy, and a represents a weighty factor between 0 and 1 associated with each node.

12. The printing apparatus controller according to claim 9, wherein the weighty factor associated with each node is based on the classification of the nodes in the color space region.

13. The printing apparatus controller according to claim 12, wherein the weighting factors are filtered to produce smooth transitions.

14. A printing apparatus controller comprising:

a non-transitory computer readable medium storing instructions that, when executed by the controller, cause the controller to perform a method for generating a multidimensional printer profile for a color printer, the method comprising:
a) receiving a plurality of target colors associated with a device independent color space, each target color associated with a respective node of the device independent color space;
b) calculating device dependent color space representations of the target colors as a function of a First Gray Component replacement (GCR) strategy and a second GCR strategy, wherein the first GCR strategy and second GCR strategy are blended to generate a blended device dependent color space representation of a respective target color; and
c) associating the device dependent color space representations with their respective target colors to generate a multidimensional printer profile;
step b) and c) comprising:
calculating a first group of device dependent color space representations of the target colors using a first Gray Component Replacement (GCR) strategy; and
calculating a second group of device dependent color space representations of the target colors using a second GCR strategy;
blending the first and second group of device dependent color space representations to generate the multidimensional printer profile including a device dependent color space representation calculated as a function of the respective device dependent color space representation associated with the first group and the respective device dependent color space representation associated with the second group,
wherein the first GCR strategy is a K restricted method and the second GCR strategy is a gamut classification method.

15. A printing system comprising:
a color printing device configured to receive data representation of a color image to be marked on a media substrate; and
a controller operatively connected to the color printing device, the controller configured to access a multidimensional printer profile LUT associating a plurality of colorimetric nodes with respective printing device dependent color space data representations, the printing device dependent color space data representations generated by the method comprising:
a) receiving a plurality of target colors associated with a device independent color space, each target color associated with a respective node of a colorimetric space;
b) calculating device dependent color space representations of the target colors as a function of a first Gray Component replacement (GCR) strategy and a second GCR strategy, wherein the first GCR strategy and second GCR strategy are blended to generate a blended device dependent color space representation of a respective target color;
c) associating the device dependent color space representations with their respective target colors to generate a multidimensional printer profile
wherein the controller accesses the printer profile LUT to provide printing device dependent color space data representations to the color printing device for marking on the media substrate,
step b) and c) comprising:
calculating a first group of device dependent color space representations of the target colors using a first Gray Component Replacement (GCR) strategy;
calculating a second group of device dependent color space representations of the target colors using a second GCR strategy; and
blending the first and second group of device dependent color space representations to generate the multidimensional printer profile including a device dependent color space representation calculated as a function of the respective device dependent color space representation associated with the first group and the respective device dependent color space representation associated with the second group;
d) iteratively calculating a second set of device dependent color space representations using the respective calculated device dependent color space representations of step b) as initial values and using the respective target colors to generate an error which is iteratively reduced; and
e) associating the second set of device dependent color space representations with their respective target colors to generate a second multidimensional printer profile.

16. A printing system comprising:
a color printing device configured to receive data representation of a color image to be marked on a media substrate; and
a controller operatively connected to the color printing device, the controller configured to access a multidimensional printer profile LUT associating a plurality of colorimetric nodes with respective printing device dependent color space data representations, the printing device dependent color space data representations generated by the method comprising:
a) receiving a plurality of target colors associated with a device independent color space, each target color associated with a respective node of a colorimetric space;
b) calculating device dependent color space representations of the target colors as a function of a First Gray Component replacement (GCR) strategy and a second GCR strategy, wherein the first GCR strategy and second GCR strategy are blended to generate a blended device dependent color space representation of a respective target color,
the blended device dependent color space representations of the respective node associated with the target colors calculated using the formula:

$$Y_{kb}(X)=a(X)*Y_{k1}(X)+(1-a(X))*Y_{k2}(X),$$

where $Y_{kb}(X)$ represents the blended device dependent color space representation associated with node X, $Y_{k1}(X)$ represents the device dependent color space representation associated with node X using the first GCR strategy, $Y_{k2}(X)$ represents the device dependent color space representation associated with node X using the second GCR strategy, and a represents a weighting factor between 0 and 1 associated with each node; and
c) associating the device dependent color space representations with their respective target colors to generate a multidimensional printer profile,
wherein the controller accesses the printer profile LUT to provide printing device dependent color space data representations to the color printing device for marking on the media substrate, and
step b) and c) comprises:
calculating a first group of device dependent color space representations of the target colors using a first Gray Component Replacement (GCR) strategy;

calculating a second group of device dependent color space representations of the target colors using a second GCR strategy; and blending the first and second group of device dependent color space representations to generate the multidimensional printer profile including a device dependent color space representation calculated as a function of the respective device dependent color space representation associated with the first group and the respective device dependent color space representation associated with the second group.

17. The printing system according to claim 16, wherein the color space of the nodes is one of RGB and L*a*b*, and the device dependent color space is CMYK.

18. The printing system according to claim 16, wherein the weighting factor associated with each node is based on the classification of the nodes in the color space region, i.e., skin tone and sky tone regions.

19. The printing system according to claim 18, wherein the weighting factors are filtered to produce smooth transitions.

20. A printing system comprising:
a color printing device configured to receive a data representation of a color image to be marked on a media substrate; and
a controller operatively connected to the color printing device, the controller configured to access a multidimensional printer profile LUT associating a plurality of colorimetric nodes with respective printing device dependent color space data representations, the printing device dependent color space data representations generated by the method comprising:
a) receiving a plurality of target colors associated with a device independent color space, each target color associated with a respective node of a colorimetric space;
b) calculating device dependent color space representations of the target colors as a function of a First Gray Component replacement (GCR) strategy and a second GCR strategy, wherein the first GCR strategy and second GCR strategy are blended to generate a blended device dependent color space representation of a respective target color; and
c) associating the device dependent color space representations with their respective target colors to generate a multidimensional printer profile,
wherein the controller accesses the printer profile LUT to provide printing device dependent color space data representations to the color printing device for marking on the media substrate, and
step b) and c) comprises:
calculating a first group of device dependent color space representations of the target colors using a first Gray Component Replacement (GCR) strategy;
calculating a second group of device dependent color space representations of the target colors using a second GCR strategy; and
blending the first and second group of device dependent color space representations to generate the multidimensional printer profile including a device dependent color space representation calculated as a function of the respective device dependent color space representation associated with the first group and the respective device dependent color space representation associated with the second group,
wherein the first GCR strategy is a K restricted method and the second GCR strategy is a gamut classification method.

* * * * *